United States Patent [19]  [11] Patent Number: 4,933,922
Yokogawa  [45] Date of Patent: Jun. 12, 1990

[54] APPARATUS FOR GENERATING A TRACKING ERROR SIGNAL
[75] Inventor: Fumihiko Yokogawa, Saitama, Japan
[73] Assignee: Pioneer Electronic Corporation, Tokyo, Japan
[21] Appl. No.: 273,543
[22] Filed: Nov. 21, 1988
[30] Foreign Application Priority Data
  Apr. 15, 1988 [JP] Japan ................... 63-93882
[51] Int. Cl.⁵ .............................. G11B 7/00
[52] U.S. Cl. ................................. 369/44.11
[58] Field of Search ............... 250/201; 358/342, 907; 369/43–47
[56] References Cited
  U.S. PATENT DOCUMENTS
  4,286,318 8/1981 Immink et al. ............... 369/44 X
  4,611,319 9/1986 Naito ......................... 369/47
  4,688,202 8/1987 Mukai et al. .................. 369/44

Primary Examiner—Robert L. Richardson
Attorney, Agent, or Firm—Fleit, Jacobson, Cohn, Price, Holman & Stern

[57] ABSTRACT

A tracking error signal generating apparatus for use in a recording and reproducing system employing a disk on which is formed an information track comprising a pair of tracking markers and a time-division servo signal including a sync signal. An error is calculated from any two of the tracking marker data obtained from the disc and a series of error data is generated. Furthermore, a series of corrected error data is generated by respectively inserting at least one neighboring value of adjacent two data between the adjacent two data of the error data, and each of the corrected error data are converted to form an analog signal.

2 Claims, 4 Drawing Sheets

FIG.1
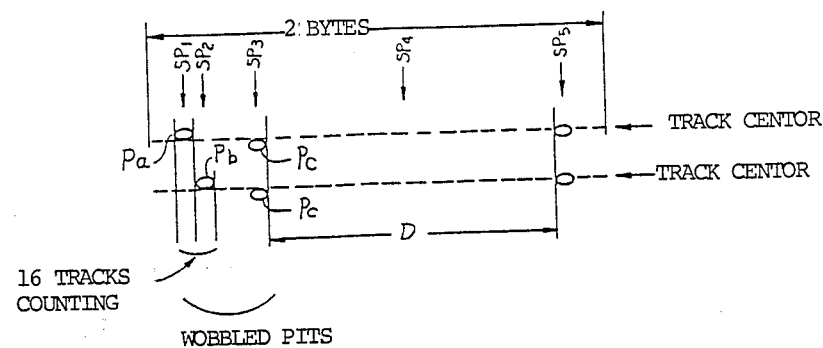
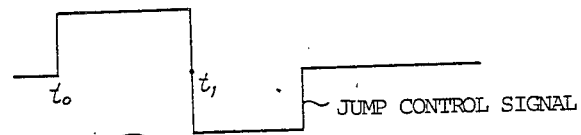
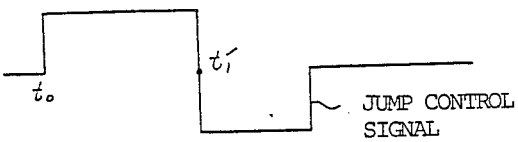

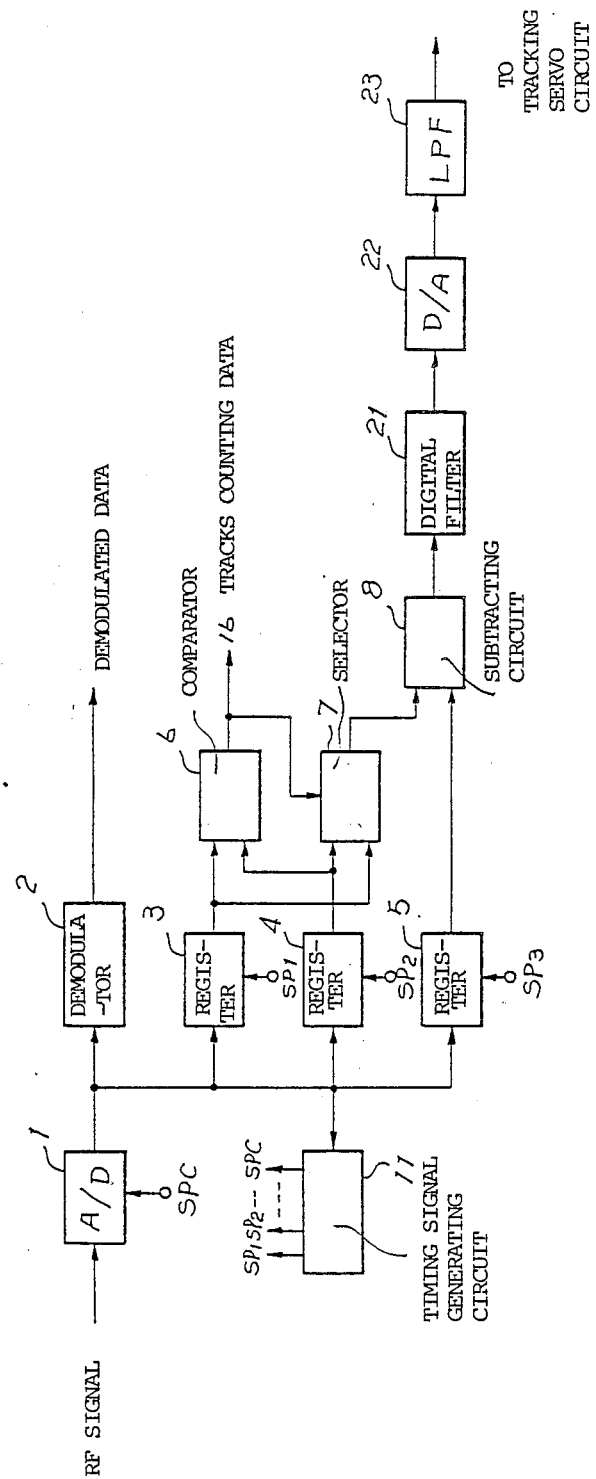

APPARATUS FOR GENERATING A TRACKING ERROR SIGNAL

BACKGROUND OF THE INVENTION

1. Field of the Invention

The present invention relates to an apparatus for generating a tracking error signal for use in a data recording and reproducing system using a disc, and more specifically to a tracking error signal generating apparatus of the sampled-format system.

2. Description of Background Information

On a write once type disk designated as the DRAW (Direct Read After Write) disk for example, a time-division servo signal is recorded as illustrated in FIG. 1. Each sector of the write once disk is made up of 43 servo blocks, and each servo block is formed of two bytes of servo bytes and 16 bytes of data bytes disposed in succession thereto. A servo byte is constituted by two wobbled pits and one clock pit, the wobbled pits being disposed on left and right side of the track center, serving as a marker for the tracking servo operation. When the information detecting point of the pickup (a light spot for detecting information) moves on the track center, the decreases in quantity of light at the left and right wobbled pits becomes equal with each other, while the decreases in quantity of light becomes different depending upon the direction and magnitude of the shift amount when the position of the movement is shifted to left or right. Therefore, a tracking error signal can be generated from the difference between the decreased amounts (the difference between levels of RF signals) at two positions and this tracking error signal is held during the period of the next data signal section.

The distance between two adjacent wobbled pits is varied between longer and shorter distances at intervals of 16 tracks. By sensing the change in the distance, it is made possible even in a high-speed count mode to count the number of tracks correctly (this operation being designated as the 16-track counting).

Furthermore, the distance D between the latter of two wobbled pits and a clock bit is set to a particular distance which does not appear in the data signal section. Therefore, the distance D can be detected as a synchronizing signal. Various timing signals are generated on the basis of the synchronizing signal detected in such a manner. The clock is generated correspondingly to a detection signal of the clock pits. The mirror portion between the pits for the distance D is used as a focus area in which a focus error signal is detected and the focus error signal is held during the period of the next data signal section.

When a DRAW disk having a diameter of 5 inches with such servo bytes recorded thereon, for example, is rotated at 1800 rpm, the pulse generated in the RF signal from the clock pits will have a repetition frequency of 41.28 KHz.

Japanese Patent Application No. 61-198531 (Laid-open No. P63-53760) specifically discloses an example of a recording and reproducing system which is arranged to read the address data and information data recorded on the DRAW disc following the servo signal section, to record the data in a data information part and to reproduce the recorded data.

If it is attempted to construct a tracking error signal generating part of such a recording and reproducing system by digital circuits for the purpose of downsizing of the system, utilizing a recent advancement of the digital IC technology, a circuit construction as illustrated in FIG. 2 is conceivable.

In FIG. 4, a pickup (not shown) is arranged to follow a track on the DRAW disc in accordance with the operation of a tracking servo system, to read the recorded information and to provide an RF output signal. The RF signal is converted to a sampled data by means of an A/D converter I operating as a sampling means which performs a data sampling in accordance with a sampling pulse. The sampled data is supplied to a demodulator 2, registers 3 through 5, and to a timing signal generating circuit 11.

The timing signal generating circuit I1 is configured to detect the said sync signal by means of a particular pattern detecting circuit incorporated therein, so as to distinguish the arrival of the clock pit. The timing signal generating circuit 11 generates a system clock which is synchronized with the detection of this clock pit, and supplies the clock to various parts of the circuit (the circuit connections of the system clock are not specifically illustrated), and generates a sampling signal SPC, and sampling pulses $SP_1$ through $Sp_n$.

The demodulator 2 is made up of, for example, a 4/15 demodulating circuit, and demodulates the above-mentioned sampled data, to generate a demodulation data which in turn is supplied to a data processing circuit (not illustrated).

The registers 1 through 3 respectively take-in the sampled data in response to the supply of respective one of the sampling pulses $SP_1$ through $SP_3$. The sampling pulses $SP_1$ through $SP_3$ are generated in order as the information reading spot of the pickup travels over the wobbled pits Pa, Pb, and Pc. With this sequence, read levels of the pits Pa through Pc are respectively stored in the registers 3 through 5. As mentioned before, either one of the pits Pa and Pb is recorded every 16 track turns alternately. The data held in the registers S and 4 are supplied to a comparator 6 in which the values of the data are compared with each other, and a comparison signal indicating a result of comparison is outputted. The comparison signal is supplied, as the 16 tracks count data, to a pickup advancement control circuit (not shown) for example. The data held in the registers 3 and 4 are also supplied to a selector 7. The selector transmits one of the data having a larger value to one of two input terminals of a subtracting circuit 8 in accordance with the said comparison signal. The registers and circuits 3 through 7 constitute a tracking data separating means.

The data held in the register 5 is supplied to the other input terminal of the subtracting circuit 8. The subtracting circuit 8, operating as an error calculating means, is operative to obtain a tracking error data by calculating a difference between the supplied data, and supply it to a D/A converter 9. The tracking error data is converted to an analog signal by the D/A converter 9, and supplied to a tracking servo circuit (not shown) as a tracking error signal after passing through a low-pass filter 10 in which a sampling frequency component of 41.28 KHz is eliminated.

The tracking error signal is generated in this way.

However, the above-described tracking error generating system needs improvements with respect to the following points.

At first, in the tracking error signal generating system of the above-mentioned sampled format system, the sampling frequency is 41.28 KHz when the disk is rotated at 1800 rpm. Since the output signal of the D/A converter 9 shows a characteristic of the first-order hold function, the so-called phase rotation $\theta$ generated by the sampling under such a condition is expressed by the following equation of: $\theta = -\pi \cdot (f/41.28)$ radian, in which f represents the bandwidth of the tracking servo frequency. If the bandwidth of the tracking servo frequency is 3 KHz, then the phase rotation becomes equal 13 degrees. In order to compensate for the phase rotation of 13 degrees, it is necessary to provide a phase compensation circuit in the next stage of the tracking error signal generating circuit.

On the other hand tracking actuators driven by the tracking error signal generally have a high-order resonance characteristic. The high-order resonance characteristic appears, for example, in a frequency range of 10 through 15 KHz, it is desirable to set the cut-off frequency of the said low-pass filter below 10 KHz, so as to sufficiently suppress components of the signal in the resonance frequency band. However, if such a measure is taken, it will cause a problem that the phase rotation appears in the tracking error signal due to the phase characteristic of the low-pass filter.

In addition, the tracking error can be always read as far as the pickup follows the recording track, in the case of a video disc which is a ROM type recording medium. However, with the disk of the sampled format system, the tracking error can be read only in the portion of tracking marker. Thus, the sensed tracking error has a discrete nature, and the quantizing noise is inevitably generated.

Now, a case of performing a track jump during the disk of this type is played, will be considered. If a system in which, as shown in FIGS. 8A and 3B, a jump control signal applied to a tracking actuator of the pickup is changed from a "kick" state for driving the actuator to a braking state for suppressing an swinging movement of the actuator, at a zero-crossing point of the tracking error, there can be a chance that the changeover from the kick state to the braking state is not performed at the proper zero-crossing of the tracking error, and the time period required for converging the jump operation is prolonged.

More specifically, if the zero-crossing of the tracking error occurs at a sampling time $t_1$ as illustrated in FIG. 3C, it is sufficient to effect the change-over of the jump control signal at the zero-crossing point of the tracking error signal. However, when the zero-crossing of the tracking error occurs at a time other than the sampling time $t_1$ as illustrated in FIG. 3D, the timing of change-over will not correspond to the proper zero-crossing time of the tracking error as illustrated in FIG. 8E if the change-over of the jump control signal is performed at the zero-crossing of the tracking error signal. The variation of the timing of the change-over of the jump control operation is $\pm(1/41.28$ KHz$)$ seconds which is equal to the sampling interval.

OBJECT AND SUMMARY OF THE INVENTION

An object of the present invention is therefore to provide an apparatus for generating a tracking error signal using digital circuits which is capable of generating a tracking error signal having very little level and phase errors from a tracking servo signal read from the disk.

In order to attain the above object, a tracking error signal generating apparatus according to the present invention for use in a recording and reproducing system employing a disk on which is formed an information track comprising a pair of tracking markers and a time-division servo signal including a sync signal, is characterized by a pickup for tracing the information track and generating a read signal, a sampling means for sampling the read signal in accordance with a sampling clock signal and generating a series of read data, a timing signal generating means for extracting the sync signal from the read data, controlling the phase of the sampling clock signal on the basis of the extracted sync signal, and generating a tracking data timing signal corresponding to the position of the tracking markers on the time base on the basis of the extracted sync signal, a tracking data separating means for separating a pair of tracking marker data from the read data, an error operating means for operating an error from any two of the tracking marker data and generating a series of error data, a data inserting means for obtaining a series of corrected error data by respectively inserting at least one neighboring value of adjacent two data between the adjacent two data of the error data, and a D/A converting means for converting each of the corrected error data to an analog signal.

BRIEF DESCRIPTION OF THE DRAWINGS

FIG. 1 is an explanatory diagram for explaining the sampled servo system;

FIGS. 3A through 3E are explanatory diagrams for explaining the generation of a track jump signal in the preceding example of the apparatus;

FIG. 4 is a block diagram showing an example of the tracking error signal generating apparatus according to the present invention;

DETAILED DESCRIPTION OF A PREFERRED EMBODIMENT

Figure 2:
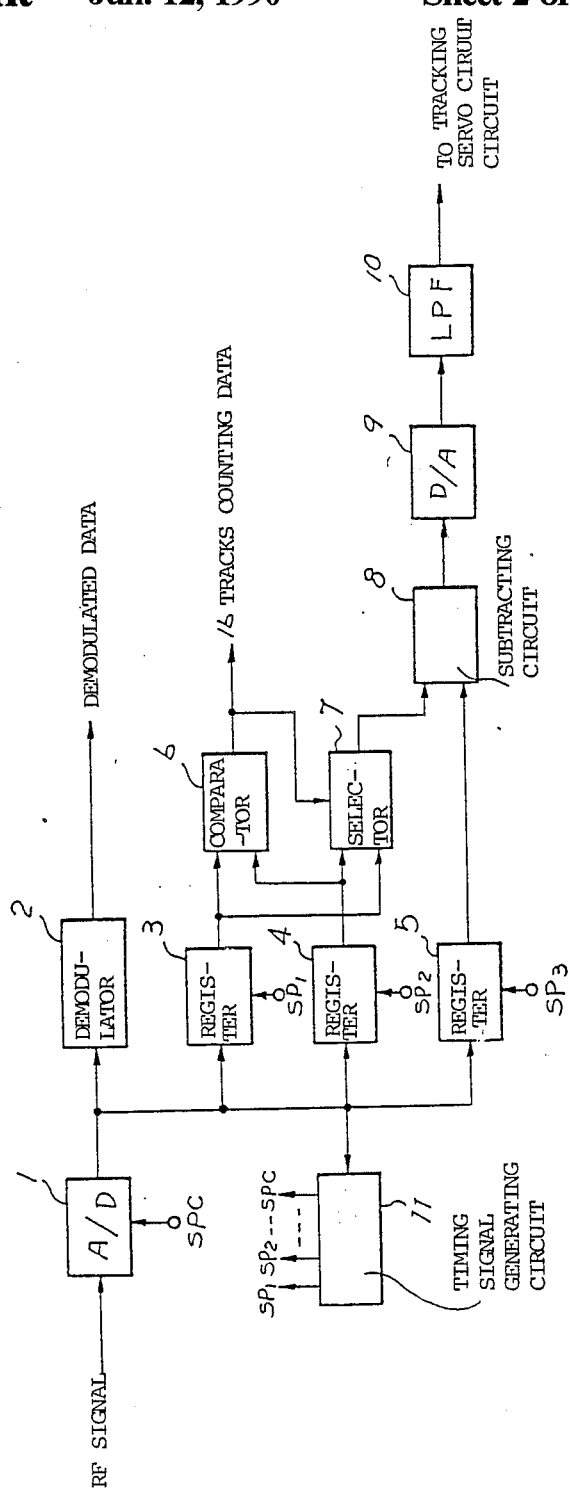
FIG. 2 is a block diagram showing a preceding example of the tracking error signal generating apparatus.

An embodiment of the present invention will be explained with reference to FIG. 4 of the accompanying drawings. In the circuit arrangement shown in FIG. 4, circuit parts corresponding to those of the apparatus shown in FIG. 2 are denoted by the same reference numerals, and the explanation of those parts will not be repeated here.

In FIG. 4 the tracking error data outputted by the subtracting circuit 8 is supplied to a digital filter 21.

Figure 5:
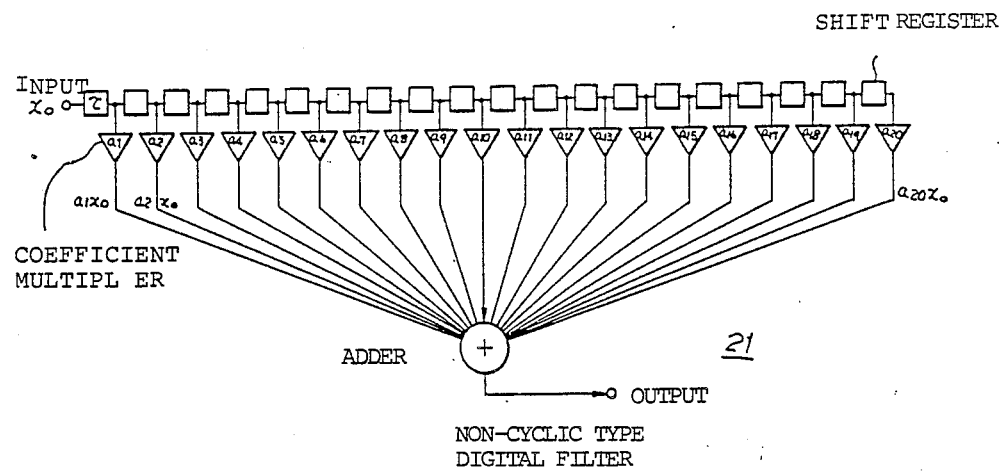
FIG. 5 is a block diagram showing a example of construction of the digital filter.

An example of the construction of the digital filter 21 is shown in FIG. 5. As shown in FIG. 5, the digital filter 21 is a non-cyclic type digital filter which comprises shift n registers, n coefficient multipliers, and an adder. Each of the shift registers is set at an N (N being an integer equal to or greater than 2) -multiple of the sampling frequency 41.28 KHz. By suitably selecting the coefficient of each of the coefficient multiplier, a low-pass filter of a predetermined characteristic can be formed. By means of the digital filter 21 having the above-described construction, a sampling frequency conversion is performed so that data values are inserted into spaces of the tracking error data generated originally, filling up such spaces. The output data of the digital filter 21 is supplied to a D/A converter 22.

The D/A converter 22 operates in accordance with a clock signal having a frequency of N times the sampling frequency 41.28 KHz, and generates a tracking error signal by converting the data supplied thereto to an analog signal each time. This tracking error signal is supplied to a tracking servo circuit in the next stage after passing through a low-pass filter 23 which removes higher harmonic components. Other components of this circuit (apparatus) are the same as corresponding components of the circuit shown in FIG. 2.

Figures 6A, 6B:
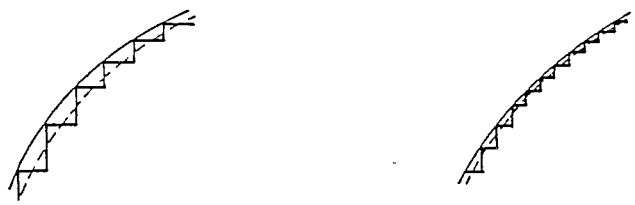
FIGS. 6A and 6B are explanatory diagrams showing examples of a result of signal processing.

FIG. 6A shows the tracking error and the tracking error data supplied to the D/A converter in the preceding example, by solid lines, and also shows the phase delay by the sampling operation under that condition, by a dashed line. On the other hand, FIG. 6B shows an example of the signal supplied to the D/A converter in the embodiment of the present invention, in which a double over-sampling is performed by setting a value 2 as N. In this figure, the tracking error and the tracking error data supplied to the D/A converter are shown by the solid lines, and the phase delay by the sampling operation is shown by the dashed line. As is apparent from the comparison between those figures, the phase rotation and the quantizing noise are reduced by the interpolation of operational data in spaces of the sampled data.

When the frequency after the sampling frequency conversion is N times the original frequency, the phase delay becomes as small as 1/N. Therefore, the afore-described Variation of the change-over timing of the jump control operation becomes equal to 1/(N×41.28 KHz) second. Thus, a significant improvement can be attained.

In the case of the non-cyclic filter as illustrated in FIG. 6, the amplitude and phase characteristics in its bandwidth can be made flat by adjusting the coefficient of the coefficient multipliers. Therefore, even if the cut-off frequency of the filter is selected at about 10 KHz, the phase delay of the processed tracking error signal is very small. Therefore, components above the cut-off frequency, which are in a frequency range of 10 through 15 KHz and correspond to the higher-order resonance frequency of tracking actuator, are reduced in level. As a result, the low-pass filter 23 bears only the task of reducing the higher harmonic noise components. Therefore, the cut-off frequency of the low-pass filter 23 can be set at a frequency above 20 KHz in consideration of the higher harmonic components of the sampling frequency components and so on, and the phase delay of the low-pass filter 23 in a low frequency range is sufficiently reduced, to improve the phase characteristic of the tracking error signal which has passed the low-pass filter.

In the manner described above, the phase delay, quantizing errors, and the characteristic of the analog filter through the data sampling operation in the tracking error signal generating apparatus are improved significantly, so that the phase delay and the noise component of the tracking error signal are reduced. Therefore, the variation of the afore-mentioned changeover timing of the jump control signal is significantly reduced in the tracking servo circuit which is connected to the apparatus in the next stage. Furthermore, the phase rotation and residual noises in the tracking servo system will be also reduced, and the operation of the tracking servo system can be made more stable by suitably selecting the cut-off frequency of the over-sampling filter so that the components of the higher order resonance frequency of the tracking actuator are removed from the tracking error signal.

It will be appreciated from the foregoing, in the digitized tracking error signal generating apparatus according to the present invention, the tracking error read from a disk of the sampled format type in a discrete manner is converted to a digital data one by one, and at least one neighboring value of adjacent two data is inserted between each adjacent two data of a series of data obtained by the conversion. Each digital data is then converted to form an analog signal. Thus, it is very advantageous that the phase rotation and noises in the tracking error signal obtained by the above process are suppressed to be small enough.

What is claimed is:

1. A tracking error signal generating apparatus for use in a recording and reproducing system employing a disk on which is formed an information track comprising a pair of tracking markers and a time-division servo signal including a sync signal, comprising:
    a pickup for tracing said information track and generating a read signal;
    a sampling means for sampling said read signal in accordance with a sampling clock signal and generating a series of read data;
    a timing signal generating means for extracting said sync signal from the read data, controlling the phase of said sampling clock signal on the basis of the extracted sync signal, and generating a tracking data timing signal corresponding to the position of said tracking markers on a time base on the basis of the extracted sync signal,
    a tracking data separating means for separating a pair of tracking marker data from the read data;
    an error operating means for operating an error from any two of the tracking marker data and generating a series of error data;
    a data inserting means for obtaining a series of corrected error data by respectively inserting at least one neighboring value of adjacent two data between said adjacent two data of said error data; and
    a D/A converting means for converting each of said corrected error data to an analog signal.

2. A tracking error signal generating apparatus as set forth in claim 1, wherein said data inserting means is an over-sampling digital filter.

* * * * *